US012165472B2

(12) United States Patent
Scheffel et al.

(10) Patent No.: US 12,165,472 B2
(45) Date of Patent: Dec. 10, 2024

(54) GAMING DEVICE THAT EMPLOYS CENTRALIZED DETERMINATION SYSTEM

(71) Applicant: IGT, Las Vegas, NV (US)

(72) Inventors: Nicholas Scheffel, Reno, NV (US); Gunnar Wambaugh, Sparks, NV (US); Xin Yu, Reno, NV (US)

(73) Assignee: IGT, Las Vegas, NV (US)

( * ) Notice: Subject to any disclaimer, the term of this patent is extended or adjusted under 35 U.S.C. 154(b) by 217 days.

(21) Appl. No.: 17/844,813

(22) Filed: Jun. 21, 2022

(65) Prior Publication Data

US 2023/0306814 A1 Sep. 28, 2023

Related U.S. Application Data

(60) Provisional application No. 63/324,585, filed on Mar. 28, 2022.

(51) Int. Cl.
*G07F 17/32* (2006.01)

(52) U.S. Cl.
CPC ........ *G07F 17/3244* (2013.01); *G07F 17/323* (2013.01); *G07F 17/3265* (2013.01); *G07F 17/3293* (2013.01)

(58) Field of Classification Search
CPC ............... G07F 17/3244; G07F 17/323; G07F 17/3265; G07F 17/3293
USPC ............................................................ 463/17
See application file for complete search history.

(56) References Cited

U.S. PATENT DOCUMENTS 7,568,973 B2 * 8/2009 Iddings ............... G07F 17/3258 463/25
8,147,334 B2 4/2012 Gatto et al.
8,764,566 B2 7/2014 Miltenberger et al.
9,536,392 B1 * 1/2017 Luciano, Jr. ........ G07F 17/3258
2007/0060314 A1 * 3/2007 Baerlocher ......... G07F 17/3258 463/25
2007/0060321 A1 * 3/2007 Vasquez .................. G07F 17/32 463/27
2007/0191088 A1 * 8/2007 Breckner ............ G07F 17/3258 463/20
2007/0218975 A1 * 9/2007 Iddings ............... G07F 17/3223 463/25
2008/0020832 A1 * 1/2008 Iddings ............... G07F 17/3223 463/27
2017/0076555 A1 * 3/2017 Luciano, Jr. ............ G07F 17/34
2022/0076532 A1 * 3/2022 Weaver ............... G07F 17/3213

* cited by examiner

*Primary Examiner* — Pierre E Elisca
(74) *Attorney, Agent, or Firm* — Sheridan Ross P.C.

(57) ABSTRACT

The present disclosure relates generally to a gaming system, device, and method supportive of playing a game of chance and/or skill in a centralized gaming system. Illustratively, a method may include receiving information from a centralized gaming server describing a prize value to award a player in response to the player playing a game at a gaming device; determining a game outcome of the game results in a payout value that is different from the prize value; and providing the player with a split award that reconciles the difference between the prize value and the payout value.

17 Claims, 7 Drawing Sheets

GAMING DEVICE THAT EMPLOYS CENTRALIZED DETERMINATION SYSTEM

CROSS REFERENCE TO RELATED APPLICATION

The present application claims the benefits of and priority, under 35 U.S.C. § 119(e), to U.S. Provisional Application No. 63/324,585 filed Mar. 28, 2022 by Scheffel et al and entitled "Gaming Device that Employs Centralized Determination System" of which the entire disclosure is incorporated herein by reference for all purposes.

BACKGROUND

The present disclosure is generally directed toward gaming devices and systems and, more specifically, central determination systems.

Some gaming systems provide the gaming device (e.g., an Electronic Gaming Machine (EGM)) with a Random Number Generator (RNG) or the like to make determinations for a game outcome. In such systems, the gaming machine determines the value to award based on the game outcome. Gaming devices that operate in a centralized determination system have different technical problems to address, especially where the game is not purely based on chance.

BRIEF SUMMARY

In certain aspects, the present disclosure relates to a centralized gaming system, a device that operates in a centralized gaming system, and a method of operating a centralized gaming system. Aspects of the present disclosure also relate to providing a centralized gaming system that supports game play for games of chance, skill, or combinations thereof.

According to one embodiment, a system can comprise a communications interface, a display device, a processor coupled with the communications interface and the display device, and a memory coupled with and readable by the processor. The memory can store therein a set of instructions which, when executed by the processor, causes the processor to receive, from a centralized gaming server, via the communications interface, an electronic message comprising information describing a prize value to award a player in response to the player playing a game at a gaming device. For example, the game can comprise a game of skill and wherein the prize value is centrally determined prior to the player providing a skill-based input to the game. In some cases, the game of skill can comprise poker and wherein the skill-based input comprises a hold selection made by the player.

The instructions can further cause the processor to determine a game outcome at the gaming device results in a payout value that is different from the prize value and provide, to the player, through the display device, an indication of a split award that reconciles the difference between the prize value and the payout value. The split award can include a first award portion that has a first value equal to the payout value and a second portion that has a second value equal to the difference between the prize value and the payout value.

The instructions can further cause the processor to determine an eligible hand to deal to the player based on the information received from the centralized gaming server. Determining the eligible hand can comprise looking up a record set of eligible initial hands and randomly selecting the eligible hand from the record set of eligible initial hands. The record set of eligible initial hands can be limited to hands that are capable of producing the prize value. For example, the game can comprise a poker game and the record set of eligible hands can comprise poker hands.

The instructions can further cause the processor to receive an indication of a hold selection from the player and select one or more new cards to deal to the player. The one or more new cards can be selected based on the information received from the centralized gaming server and the hold selection. For example, the one or more new cards can be selected to minimize a difference between the prize value and the payout value or in an attempt to match the prize value with the payout value. The instructions can further cause the processor to display, through the display device, an updated hand to the player that includes the one or more new cards.

According to another embodiment, a method can comprise receiving, by a gaming device, from a centralized gaming server, information describing a prize value to award a player in response to the player playing an electronic game on the gaming device, determining, by the gaming device, a game outcome of the electronic game results in a payout value that is different from the prize value, and providing, by the gaming device, to the player, an indication of a split award that reconciles the difference between the prize value and the payout value. The player can be provided with the indication of the split award by incrementing a credit meter of the gaming device by an amount equal to the prize value. The payout value in addition to incrementing the credit meter can be displayed by the gaming device.

In some cases, the game can comprise a game of skill and the prize value can be centrally determined prior to the player providing a skill-based input to the game. For example, the game of skill can comprise poker and the skill-based input can comprise a hold selection made by the player. In such cases, the gaming device can receive the hold selection from the player, select one or more new cards to deal to the player based on the information received from the centralized gaming server and the hold selection, and display an updated hand to the player that includes the one or more new cards.

According to yet another embodiment, a centralized gaming server can comprise a communications interface, a processor coupled with the communications interface, and a memory coupled with and readable by the processor. The memory can store therein a set of instructions which, when executed by the processor, causes the processor to receive, from a gaming device, through the communications interface, an electronic play request message associated with a game of skill being played at the gaming device, determine a prize value to award the player for the game of skill, and transmit, to the gaming device, through the communications interface, an electronic message comprising information indicating the prize value to award the player for the game of skill. The prize value can be determined prior to the player providing a skill-based input to the game of skill. For example, the game of skill can comprise poker and wherein the skill-based input comprises a hold selection made by the player.

DETAILED DESCRIPTION

Aspects of the present disclosure will be described in connection a centralized gaming system that facilitates player interactions with a game of chance, a game of skill, or combinations thereof.

Figure 1:
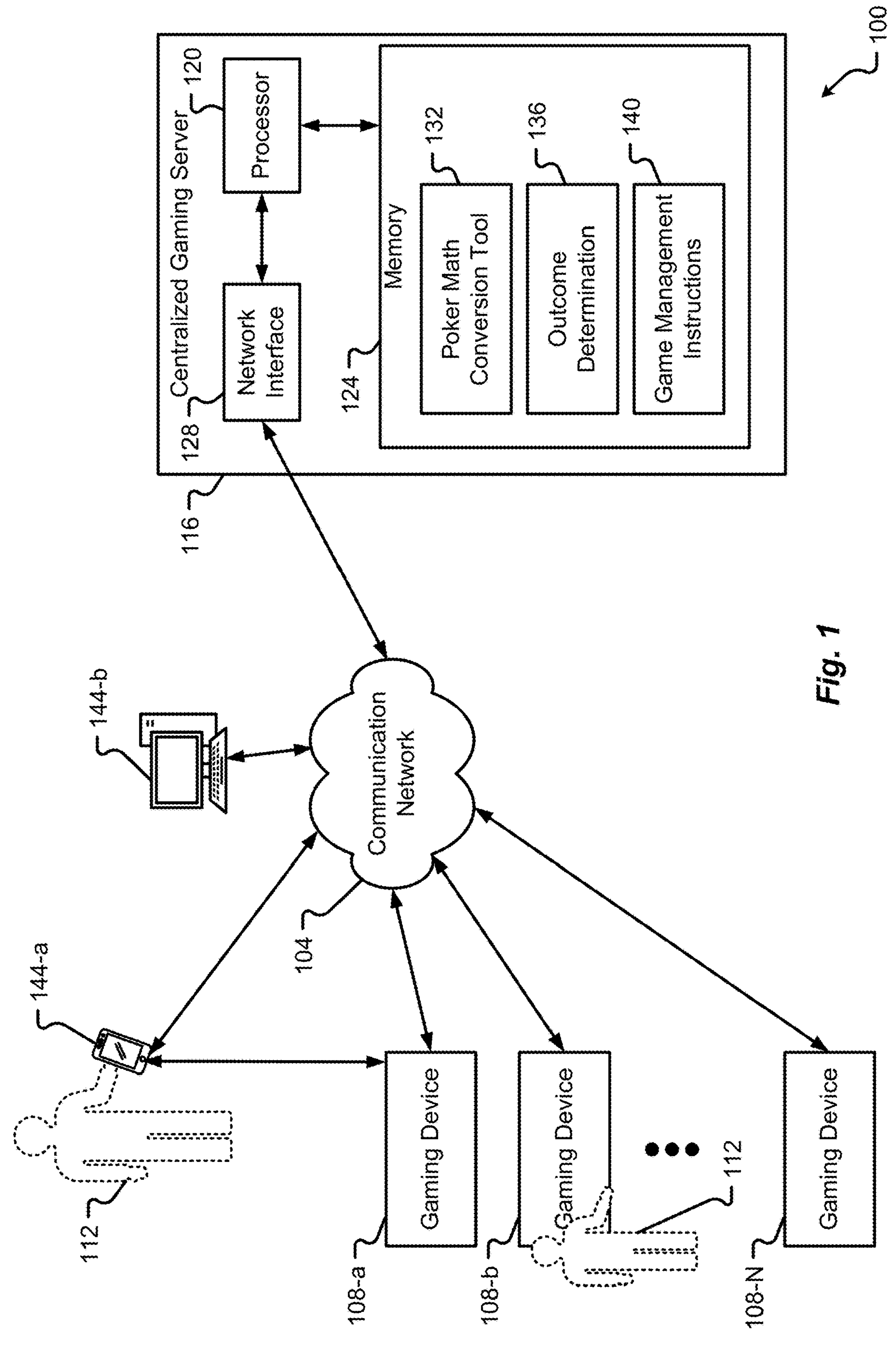
FIG. 1 is a block diagram of a centralized gaming system in accordance with embodiments of the present disclosure.

With reference initially to FIG. 1, details of an illustrative gaming system 100 will be described in accordance with at least some embodiments of the present disclosure. The components of the gaming system 100, while depicted as having particular instruction sets and devices, are not necessarily limited to the examples depicted herein. Rather, a system according to embodiments of the present disclosure may include one, some, or all of the components depicted in the gaming system 100 and does not necessarily have to include all of the components in a single device. For example, the components of a server may be distributed amongst a plurality of servers and/or other devices (e.g., a gaming device, a portable user device, etc.) in the gaming system 100 without departing from the scope of the present disclosure.

The gaming system 100 may include a communication network 104 that interconnects and facilitates machine-to-machine communications between one or multiple gaming devices 108 (e.g., any of gaming device 108-*a* through 108-N) and a gaming server 116. It should be appreciated that the communication network 104 may correspond to one or many communication networks without departing from the scope of the present disclosure. In some embodiments, gaming device 108-*a* through gaming device 108-N and centralized gaming server(s) 116 may be configured to communicate using various nodes or components of the communication network 104. The communication network 104 may include any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

In some embodiments, the gaming devices 108 (e.g., gaming device 108-*a* through gaming device 108-N) may be distributed throughout a single property or premises (e.g., a single casino floor), or the gaming devices 108 (e.g., gaming device 108-*a* through gaming device 108-N) may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 (e.g., gaming device 108-*a* through gaming device 108-N) may utilize the same or different types of communication protocols to connect with the communication network 104. It should also be appreciated that the gaming devices 108 (e.g., gaming device 108-*a* through gaming device 108-N) may present the same type of game or different types of games to a player 112. For example, the gaming device 108-*a* may correspond to a gaming machine that presents a game of chance (e.g., a slot game) to the player 112, the gaming device 108-*b* may correspond to a gaming machine that presents a game of skill (e.g., a video poker machine presenting a video poker game) to the player 112, and other gaming devices 108 may present other types of games (e.g., keno, sports wagering, etc.) or a plurality of different games for selection and eventual play by the player 112.

In some examples, some of the gaming devices 108 (e.g., gaming device 108-*a* through gaming device 108-N) may communicate or exchange data with one another via the communication network 104. In some embodiments, one or more of the gaming devices 108 may be configured to communicate directly with a centralized gaming server 116. Although not depicted, the gaming system 100 may include a separate server or collection of servers that are responsible for managing the operation of the various gaming devices 108 in the gaming system 100.

It should also be appreciated that the centralized gaming server 116 may or may not be co-located with one or more gaming devices in the same property or premises. Thus, one or more gaming devices may communicate with the centralized gaming server 116 over a WAN, such as the Internet. In such an event, a tunneling protocol or Virtual Private Network (VPN) may be established over a portion of the communication network 104 to ensure that communications between an EGM and the centralized gaming server 116 (e.g., a remotely-located server) are secured.

The gaming devices 108 (e.g., gaming device 108-*a* through gaming device 108-N) may correspond to a type of device that supports interaction by a player 112 in connection with playing games of chance and/or skill. Examples of a gaming device 108 may include any type of known gaming device such as an EGM, a slot machine, a table game, an electronic table game (e.g., video poker), a skill-based game, etc. In addition to playing games on a gaming device 108, the player 112 may also be allowed to interact with and play games of chance and/or skill on a communication device 144.

The gaming system 100 may support interaction with one or more communication devices 144. A communication device 144 (e.g., communication device 144-*a*) may be a mobile device of a player 112 (e.g., a personal communication device such as a smart phone, a tablet, a smart watch, etc.) or to a device issued by a casino to the player 112. It should be appreciated that the player 112 may play games directly on the communication device 144. Alternatively, or additionally, the communication device 144 may establish a communications (e.g., over a wireless or wired connection) with a gaming device 108 such that the communication device 144 provides an interface for the player 112 to interact with the gaming device 108. As shown in FIG. 1, the communication device 144 may be in communication with the communication network 104 or in direct communication (e.g., via Bluetooth, WiFi, etc.) with a gaming device 108. Non-limiting examples of a communication device 144 include a cellular phone, a smart phone, a tablet, a wearable device, an augmented reality headset, a virtual reality headset, a laptop, a Personal Computer (PC), or the like. In some cases, another communication device 144 (e.g., communication device 144-*b*) may be a mobile device, a PC, or the like of a casino operator (e.g., a floor attendant, a casino manager, etc.).

In some cases, the gaming system 100 may support "carding in" of a player at a gaming device 108 with a physical card (e.g., a player club card). In other cases, the gaming system 100 may support "carding in" of a player at a gaming device 108 via a mobile application on a communication device 144. In some aspects, the mobile application may support fund transfers between a player account and the gaming device 108 (e.g., a server, the casino). For example, using the mobile application, the player may transfer funds to a gaming session.

In an example of "carding in," the communication device 144 may exchange information with the gaming device 108 over a wireless connection (e.g., near field communication (NFC), Bluetooth, etc.) when the communication device 144 is within a threshold distance of the gaming device 108. In another aspect, the communication device 144 may "card in" and exchange information with the gaming device 108 when the communication device 144 is connected to the gaming device 108 using a physical communications link (e.g., a communications cable). In an example, when "carding in," the communication device 144 may provide player identification information (e.g., player identity, player club status, player preference information, etc.) to the gaming device, the centralized gaming server 116, and/or the gaming system. The centralized gaming server 116 (or the gaming device 108) may establish a gaming session at the gaming device 108 for the player based on the information provided during the "card in."

The centralized gaming server 116 is further shown to include a processor 120, a memory 124, and a network interface 128. These resources may enable functionality of the centralized gaming server 116 as will be described herein. For example, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For example, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions.

In some aspects, the gaming system 100 may be implemented using a fully software-based solution. In some other aspects, the gaming system 100 may be implemented using a combination of software and hardware accelerators for offloading AI processing tasks and/or AI data handled at the gaming system 100. Aspects of the present disclosure and solutions thereof may be used locally at an EGM (e.g., a gaming device 108), a local server (e.g., centralized gaming server 116 or a different server), and/or on a cloud server (e.g., centralized gaming server 116 or a different server). Example processors (also referred to herein as co-processors) usable for offloading the AI processing tasks and/or AI data may include any combination of GPUs, ASICs, FPGAs, or the like. In some aspects, the processors (e.g., co-processors) may be located at a gaming device 108 and/or the centralized gaming server 116. In some other aspects, processors (e.g., co-processors) located at a communication device 144 (e.g., a cellular phone, a smart phone, a tablet, a wearable device, an augmented reality headset, a virtual reality headset, etc.) may be used for offloading the AI processing tasks and/or AI data.

The centralized gaming server 116 may include components that enable the facilitating of centralized determination for games of chance, games of skill, or combinations thereof played at the gaming devices 108. Specifically, the centralized gaming server 116 may be configured to determine prize values to award a player 112 at a gaming device 108 in response to the player 112 initiating a game at the gaming device 108 (e.g., inserting money, pressing a play game input, pressing a wager input, etc.). The centralized gaming server 116 may determine the prize value to award the player 112 before the player 112 ever provides a skill-based input to the gaming device 108, even when the player 112 is playing a skill-based game, such as video poker or video blackjack, where the player 112 makes a decision on the game and the decision would normally affect the outcome of the game if the prize value were not determined prior to receiving the skill-based input.

The memory 124 of the centralized gaming server 116 may store game management instructions 140 in addition to other tools that enable the centralized determination of a prize value. In particular, the memory 124 may store a poker math conversion tool 132 and an outcome determination tool 136.

The game management instruction set 140, when executed by the processor 120, may enable the gaming server 116 to manage the various games played by a player 112 at the gaming devices 108 (e.g., gaming device 108-*a* through gaming device 108-N) and/or a communication device 144 carried by the player 112. For example, any game played by the player 112 at any of the gaming devices 108 and/or communication device 144 may be managed, partially or entirely, by execution of the game management instruction set 140.

In some aspects, the game management instruction set 140, when executed by the processor 120, may enable the gaming server 116 to manage and/or monitor data associated with a gameplay session at a gaming device 108. In some embodiments, the game management instruction set 140 may cooperate with (e.g., call or use) other instructions stored in memory 124. For instance, the game management instruction set 140 may be configured to call poker math conversion tools 132 and/or a centralized outcome determination instruction set 136. The poker math conversion tools 132 may be used to help facilitate a conversion of a determined prize value to a hand or set of hands that can be dealt to the player 112 during a game. In some embodiments, the prize value may limit or restrict the number of possible hands that are initially dealt to the player 112 and the prize value may limit or restrict the types of additional cards that are dealt to the player 112 after the player 112 provides a skill-based input (e.g., makes a hold decision in video poker, makes a "hit" decision in video blackjack, etc.).

The outcome determination instruction set 136 may be used by the game management instructions 140 to determine the actual prize value and/or when a prize is to be awarded to the player 112 in response to initiation of a game play. The outcome determination instruction set 136 may provide the decision related to prize value (or existence thereof) to the game management instructions 140, which may then call the poker math conversion tool 132 is a prize value has been positively awarded. The poker math conversion tool 132 may then provide the game management instructions 140 with information describing which hands are eligible to be dealt to the player 112 based on the prize value determined by the outcome determination instructions 136. Additional functions and interactions between the components of the centralized gaming server 116 will be described in connection with FIGS. 2-7.

Figure 2:
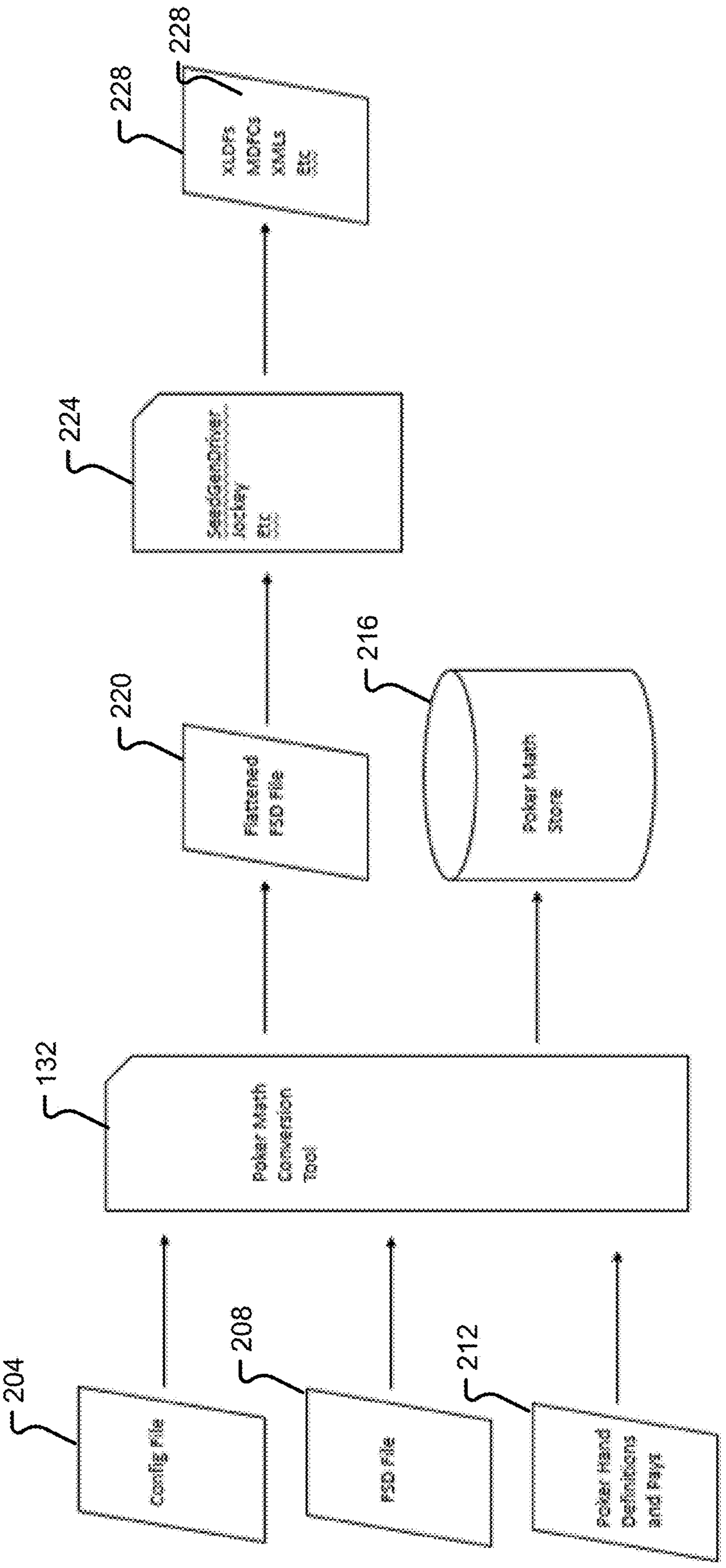
FIG. 2 is a block diagram depicting additional components of a centralized gaming system in accordance with embodiments of the present disclosure.
Figure 3:
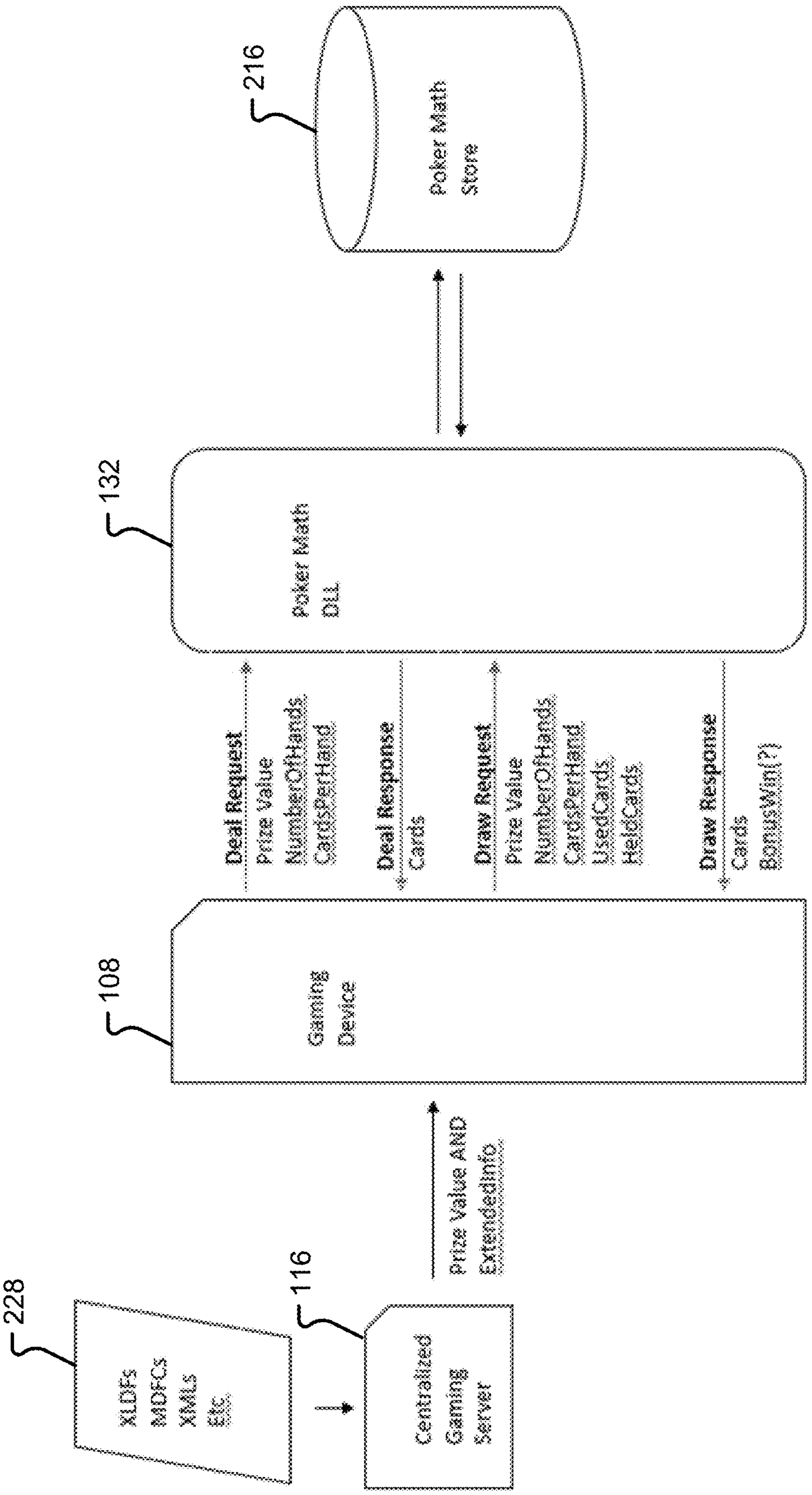
FIG. 3 is a block diagram depicting additional components of a centralized gaming system in accordance with embodiments of the present disclosure.

Referring now to FIGS. 2 and 3, additional details of the poker math conversion tool 132 and its functionality are shown. As can be seen in FIG. 2, the poker math conversion tool 132, when called by the game management instructions 140, may receive inputs in the form of a configuration file 204, a FSD file 208, and/or a poker hand definition and pays file 212.

Outputs of the poker math conversion tool 132 may include an output transmitted directly to a poker match store 216 as well as a file 220 that describes the output to generate based on the decision to award a prize value. The file 220 may be provided to a seed generation driver 224, that implements the mechanics (e.g., uses historical race data, a RNG, or the like) involved with geniting an output for the centralized gaming server 116. The seed generation driver 224 may then output 228 a prize value decision in the form of a consumable file or the like.

As shown in FIG. 3, the output 228 of the seed generation driver 224 may then be provided to the game management instructions 140 of the centralized gaming server 116. The centralized gaming server 116 may then generate information that is transmitted to a gaming device 108. The output provided by the centralized gaming server 116 to the gaming device 108 may include prize value information and extended information. The prize value information may describe the amount of a prize value to be awarded to the player 112 of the gaming device 108 at the end of a gameplay instance. The prize value will be awarded to the player 112 regardless of inputs (e.g., skill-based inputs) made by the player 112 during the remainder of the gameplay instance. The extended information may describe eligible hands that can be initially dealt to the player 112 to support the determined prize value.

The prize value and extended information passed down by the centralized gaming server 116 may be used by the gaming device 108 to lookup a record set of eligible initial hands to deal based on the prize value. The game executed at the gaming device 108 will deal a random selection from that record set. It may also be possible that some of the poker math conversion tool 132 may be provided on the gaming device 108 to support logic of the game and to help determine eligible hands or draw responses to display based on player 112 input. As shown in FIG. 3, the gaming device 108 may initially provide a deal request to the poker math conversion tool 132 along with a number of hands being played and a number of cards needed per hand. The poker math conversion tool 132 (whether implemented at the centralized gaming server 116 or on the gaming device 108) may provide a response that identifies the cards to deal to the player 112.

The gaming device 108 may then receive a hold input or draw request, which is provided back to the poker math conversion tool 132. The poker math conversion tool 132 may then provide a draw response, that is determined again on the prize value that was previously determined in response to the deal request. The draw response will again identify cards to display after the draw and the player's 112 final hand. The gaming device 108 may then present the total win, which may include just the prize value, or which may include an additional bonus if the prize value (determined at the onset of the game) exceeded the highest possible value of the final cards displayed after the draw response.

Figure 4:
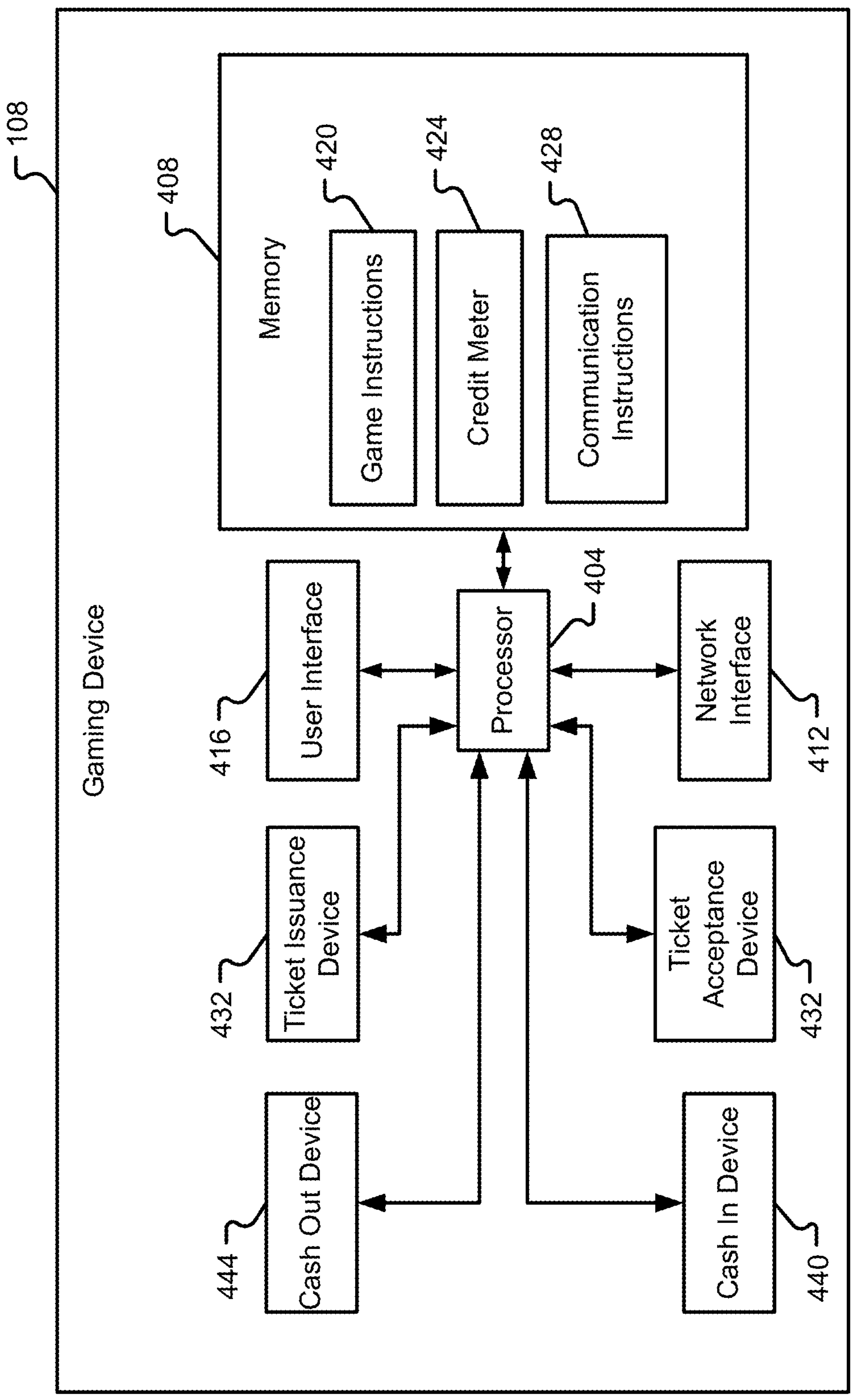
FIG. 4 is a block diagram depicting details of a gaming device in accordance with embodiments of the present disclosure.

With reference now to FIG. 4, additional details of a gaming device 108 will be described in accordance with at least some embodiments of the present disclosure. While depicted as a gaming device 108, it should be appreciated that some or all of the components of the gaming device 108 may be included in a mobile device 144 described herein without departing from the scope of the present disclosure.

The gaming device 108 is depicted to include a processor 404, memory 408, a network interface 412, a user interface 416, a ticket issuance device 432, a ticket acceptance device 436, a cash-in device 440, and a cash out device 444. In some embodiments, the processor 404 may include example aspects of the processor 120. In other words, the processor 404 may correspond to one or many microprocessors, CPUs, microcontrollers, or the like. The processor 404 may be configured to execute one or more instruction sets stored in memory 408.

The network interface 412 may include example aspects of network interface 128. The nature of the network interface 412, however, may depend upon whether the network interface 412 is provided in a gaming device 108 or a communication device 144. Examples of a network interface 412 include, without limitation, an Ethernet port, a USB port, an RS-232 port, an RS-485 port, a NIC, an antenna, a driver circuit, a modulator/demodulator, etc. The network interface 412 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 416 may correspond to any type of input and/or output device that enables the player 112 to interact with the gaming device 108. As can be appreciated, the nature of the user interface 416 may depend upon the nature of the gaming device 108. For instance, if the gaming device 108 is a traditional mechanical reel slot machine, then the user interface 416 may include one or more mechanical reels with symbols provided thereon, one or more lights or LED displays, one or more depressible buttons, a lever or "one armed bandit handle," a speaker, or combinations thereof. If the gaming device 108 is a digital device, then the user interface 416 may include one or more touch-sensitive displays, LED/LCD display screens, etc. In some cases, the user interface 416 may include a combination of a physical interface (e.g., mechanical reels, depressible buttons, a lever, etc.) and other user interfaces (e.g., touch-sensitive displays, LED/LCD display screens, etc.). In some cases, the user interface 416 may receive a player's 112 skill-based input (e.g., a hold input, a deal input, a hit input, etc.).

The memory 408 may include example aspects of memory 124. For instance, the memory 408 may include one or multiple computer memory devices that are volatile or non-volatile. The memory 408 may be configured to store instruction sets that enable player interaction with the gaming device 108, that enable game play at the gaming device 108, and/or that enable coordination with the gaming server 116. Examples of instruction sets that may be stored in the memory 408 include a game instruction set 420, a credit meter 424, and a ticket/voucher management instruction set 428.

In some embodiments, the game instruction set 420, when executed by the processor 404, may enable the gaming device 108 to facilitate one or more games of chance and/or skill and produce interactions between the player 112 and the game of chance or skill. The game instructions set 420 may enable the gaming device 108 to communicate with the centralized gaming server 116 and execute a centrally determined game. In some embodiments, the game instruction set 420 may include subroutines that present one or more graphics to the player 112 via the user interface 416, subroutines that calculate whether a particular wager has resulted in a win or loss during the game of chance or skill, subroutines for determining payouts for the player 112 in the event of a win, subroutines for exchanging communications with a connected server (e.g., game management server, gaming server 116, or the like), subroutines for enabling the player 112 to engage in a game using their communication device 144, and any other subroutine or set of instructions that facilitate gameplay at or in association with the gaming device 108.

The credit meter 424 may correspond to a secure instruction set and/or data structure within the gaming device 108 that facilitates a tracking of activity at the gaming device 108. In some embodiments, the credit meter 424 may be used to store or log information related to various activities of a player 112 and events that occur at the gaming device 108. The types of information that may be maintained in the credit meter 424 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108.

In some embodiments, the credit meter 424 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter 424 may be updated in response to outcomes of a game of chance or skill played at the gaming device 108. In some embodiments, the credit meter 424 may be updated depending upon whether the gaming device 108 is issuing a ticket/voucher, being used as a point of redemption for a ticket/voucher, and/or any other activity associated with a ticket/voucher. Some or all of the data within the credit meter 424 may be reported to the gaming server 116, for example, if such data applies to a centrally-managed game and/or a status of a ticket/voucher. As an example, the number, value, and timing of wagers placed by a particular player 112 and payouts on such wagers may be reported to the gaming server 116.

Activities of the gaming device 108 related to ticket/voucher activity may be managed and reported by the ticket/voucher management instruction set 428. In some embodiments, when a ticket/voucher is redeemed at the gaming device 108 by the player 112, information associated with the ticket/voucher may be obtained by the ticket/voucher management instruction set 428 and reported to the gaming server 116. Furthermore, the ticket/voucher management instruction set 428 may be configured to update the credit meter 424 if the redeemed ticket/voucher is determined to be in a redeemable state and has a redeemable or redemption value associated therewith. In some embodiments, the credit meter 424 may be updated or incremented by the redeemable or redemption value of the ticket/voucher when redeemed. This information may be obtained directly from the ticket/voucher or may include some interactions (e.g., verification operations) with the gaming server 116 prior to updating the credit meter 424.

The gaming device 108 may be provided with appropriate hardware to facilitate acceptance and issuance of tickets/vouchers. Specifically, the gaming device 108 may be provided with a ticket acceptance device 436 that is configured to accept or scan physically-printed tickets/vouchers and extract appropriate information therefrom. In some embodiments, the ticket acceptance device 436 may include one or more machine vision devices (e.g., a camera, IR scanner, optical scanner, barcode scanner, etc.), a non-visual scanning device (e.g., an RFID reader, an NFC reader), a physical ticket acceptor, a shredder, etc. The ticket acceptance device 436 may be configured to accept physical tickets and/or electronic tickets without departing from the scope of the present disclosure. An electronic ticket/voucher may be accepted by scanning a visual code (e.g., a one-dimensional barcode, a two-dimensional barcode, any other type of barcode, a quick response (QR) code, etc.) displayed on a printed ticket/voucher or a communication device 144, for example. In another example, an electronic ticket/ voucher may be accepted by scanning a tag (e.g., an RFID tag, an NFC tag, a contactless smart card, or the like) storing the ticket/voucher information.

The ticket issuance device 432 may be configured to print or provide physical tickets/vouchers to players 112. In some embodiments, the ticket issuance device 432 may be configured to issue a ticket/voucher consistent with an amount of credit available to a player 112, possibly as indicated within the credit meter 424. In some cases, the ticket/voucher may be an e-TITO voucher including a reprogrammable electronic display and an RFID tag.

The cash-in device 440 may include a bill acceptor, a coin acceptor, a chip acceptor or reader, or the like. In some embodiments, the cash-in device 440 may also include credit card reader hardware and/or software. In some aspects, the cash-in device 440 may include one or more machine vision devices (e.g., a camera, IR scanner, optical scanner, barcode scanner, etc.) or non-visual scanning devices (e.g., an RFID reader/writer, an NFC reader/writer).

The cash-out device 444, like the ticket issuance device 322, may operate and issue cash, coins, tokens, or chips based on an amount indicated within the credit meter 424. In some embodiments, the cash-out device 444 may include a coin tray or the like and counting hardware configured to count and distribute an appropriate amount of coins or tokens based on a player's 112 winnings or available credit within the credit meter 424. In some aspects, the cash-out device 444 may include one or more machine vision devices or non-visual scanning devices.

The game instructions 420, when executed by the processor 404, can cause the processor 404 to receive, from a centralized gaming server 116, via the communications network interface 428, an electronic message comprising information describing a prize value to award a player 112 in response to the player 112 playing a game at the 108 gaming device 108. For example, the game can comprise a game of skill and wherein the prize value is centrally determined prior to the player providing a skill-based input to the game. In some cases, the game of skill can comprise poker and wherein the skill-based input comprises a hold selection made by the player.

The game instructions 420 can further cause the processor 404 to determine a game outcome at the gaming device 108 results in a payout value that is different from the prize value and provide, to the player 112, through the user interface 416, such as a display device, an indication of a split award that reconciles the difference between the prize value and the payout value. The split award can include a first award portion that has a first value equal to the payout value and a second portion that has a second value equal to the difference between the prize value and the payout value.

The game instructions 420 can further cause the processor 404 to determine an eligible hand to deal to the player based on the information received from the centralized gaming server 116. Determining the eligible hand can comprise looking up a record set of eligible initial hands and randomly selecting the eligible hand from the record set of eligible initial hands. The record set of eligible initial hands can be limited to hands that are capable of producing the prize value. For example, the game can comprise a poker game and the record set of eligible hands can comprise poker hands.

The game instructions 420 can further cause the processor 404 to receive an indication of a hold selection from the player 112 through the user interface 416 and select one or more new cards to deal to the player 112. The one or more new cards can be selected based on the information received from the centralized gaming server 116 and the hold selection. For example, the one or more new cards can be selected to minimize a difference between the prize value and the payout value or in an attempt to match the prize value with the payout value. The game instructions 416 can further cause the processor to display, through the display device or other user interface 416, an updated hand to the player that includes the one or more new cards.

Figure 5:
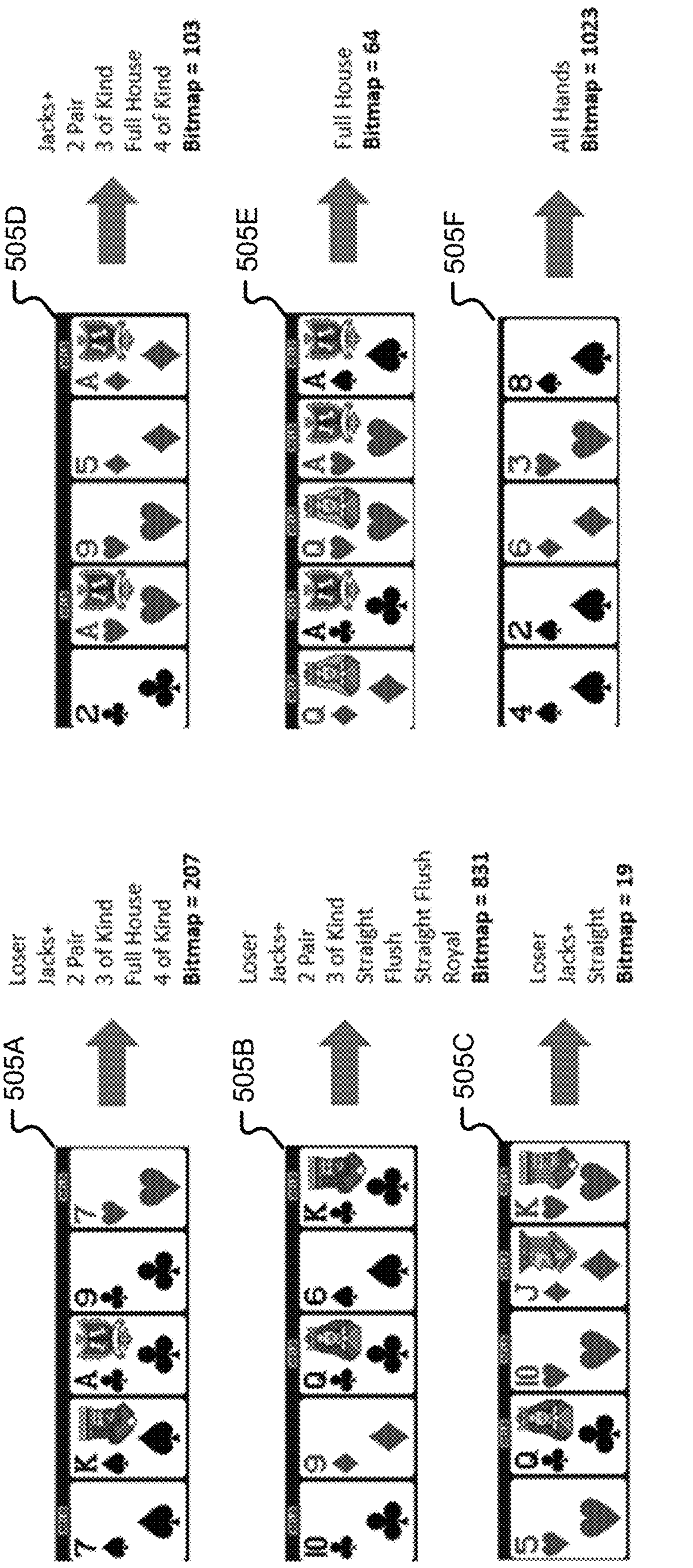
FIG. 5 illustrates hand-to-bitmap conversions used in a centralized gaming system in accordance with embodiments of the present disclosure.
Figure 6:
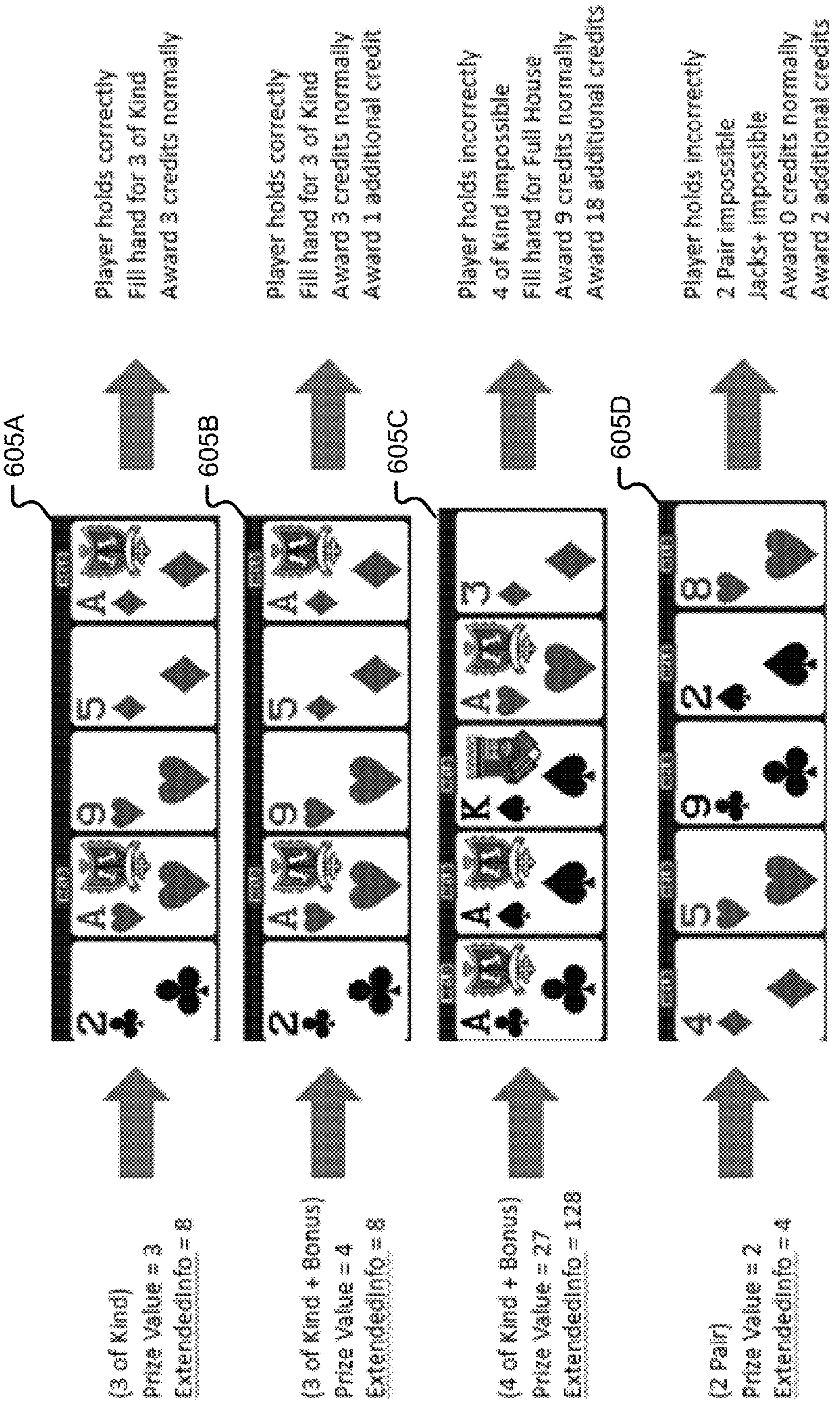
FIG. 6 illustrates award logic for use in a centralized gaming system in accordance with embodiments of the present disclosure.

FIGS. 5 and 6 illustrate examples of gameplay scenarios and the process flows that may occur during a player's 112 engagement with a game of chance and/or skill at a gaming device 108 that is receiving at least some inputs from a centralized gaming server 116. As one example, outcomes of the games played at the gaming device 108 may be centrally determined by the centralized gaming server 116 using any type of known centralized determination mechanic. The gaming device 108 and centralized gaming server 116 may cooperate with one another to facilitate such games, even when the player 112 does not provide an input that allows the game to create a payout that is equal to the prize value determined at the centralized gaming server 116.

As shown in FIGS. 5 and 6, prize values may be mapped to one or more eligible hands 505A-505F and one or more eligible cards to hold, e.g., Jacks. The cards to hold may be determined, at least in part, based on the dealt hand and the previously-determined prize value. One or more bitmaps may be used to map eligible hands 505A-505F to prize values and vice versa. The use of a bitmap may enable the selection of an eligible hand from a set of eligible hands 505A-505F using a random number generator. In other words, the bitmap may limit which hands are available to select based on which hands could provide the determined prize value. A higher prize value will likely have a smaller number of possible eligible hands 505A-505F, which means that fewer eligible hands 505A-505F will be available for selection. The bitmap can be used to eliminate the number of eligible hands 505A-505F and may facilitate selection of eligible hands 505A-505F more quickly by the gaming device 108.

According to one embodiment, a hand can be filled based on held and discarded cards, attempting to award the intended winning hand and then each lesser hand if the intended winning hand is unachievable. As can be seen in FIG. 6, if a player 112 makes a correct hold decision during a game of video poker, the game can be configured to accommodate the correct hold decision. For example, a correct hold decision on hands 605A or 605B is made fill cards can be dealt to make a winning hand. However, if a player 112 makes an incorrect hold decision during a game of video poker, then the game may be configured to accommodate the incorrect hold decision. In some examples, the appropriate additional cards may be dealt to the player 112 in response to an incorrect hold decision made on hands 605C or 605D. In embodiments where it is impossible to provide a player 112 with a new hand that achieves the determined prize value, then the game may assign a maximum number of credits to the player normally and then award any remaining credits (e.g., the difference between the prize value and the payout value) via a bonus. The ultimate payout made to the player 112 may be reconciled via the bonus.

Figure 7:
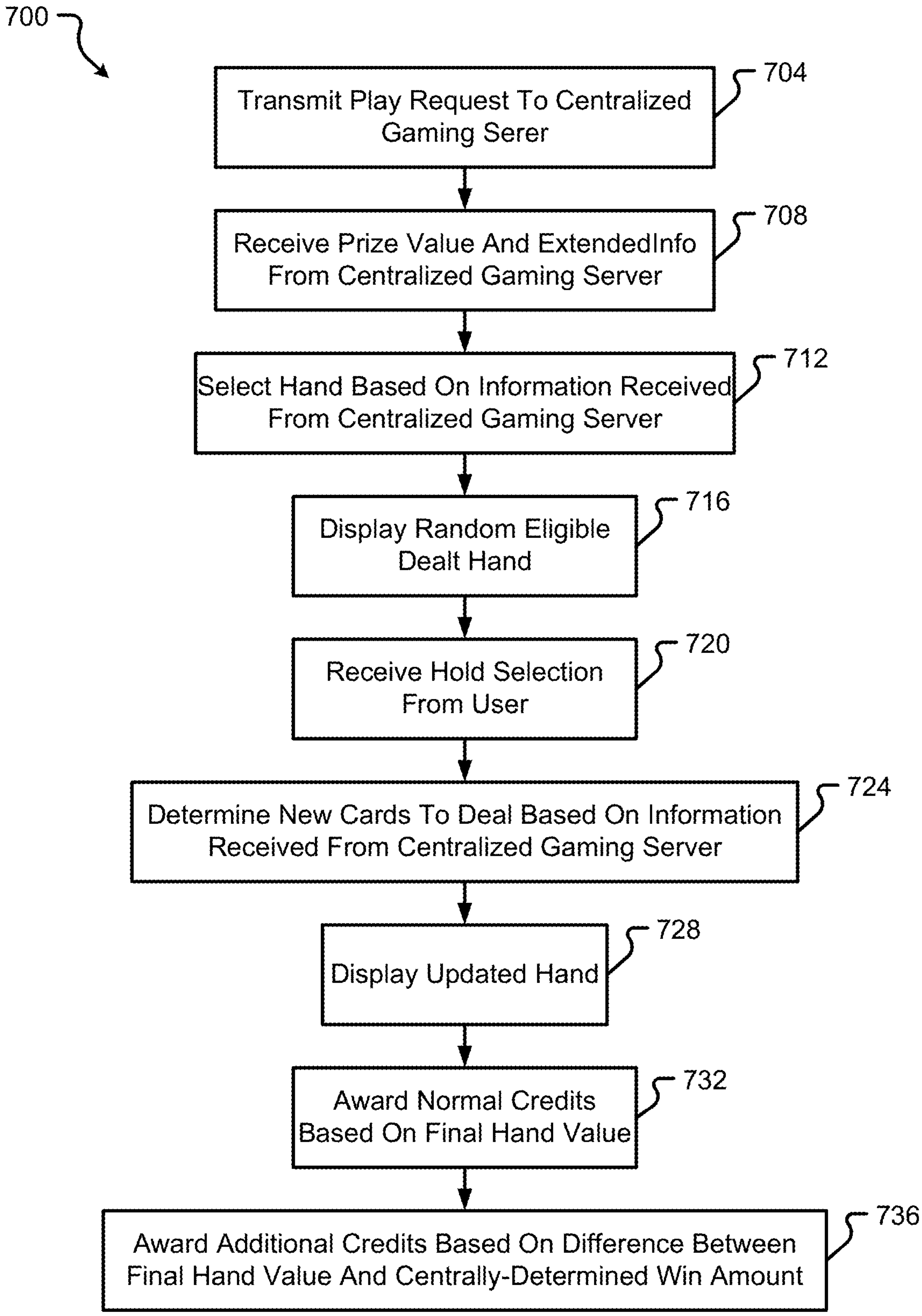
FIG. 7 is a flow diagram illustrating a method of facilitating a game in a centralized gaming system in accordance with at least some embodiments of the present disclosure.

FIG. 7 illustrates an example of a method 700 that may be used to facilitate gameplay of a game of chance and/or skill using a centralized gaming server (e.g., a centrally-determined prize value/output). Further, method 700 may be implemented by a gaming system 100 or components included therein as described with reference to FIGS. 1 through 6.

The method 700 may begin when a player 112 initiates gameplay at the gaming device 108 and the gaming device 108 transmits a play request to a centralized gaming server 116 (step 704). The centralized gaming server 116 may then initiate the game management instruction set 140 to determine a prize value for the game and a number of eligible hands to deal to the player 112 as part of helping the player 112 achieve the prize value. The centralized gaming server 116 may then provide the gaming device 108 with information describing the prize value and further extended information that describes eligible hands to deal to the player 112 (step 708).

The gaming device 108 may then select an initial hand (e.g., a dealt hand) based on the information received from the centralized gaming server 116 (step 712). The initial hand may be selected from a set of possible initial hands and the set of possible initial hands may be bounded based on the determined prize value.

The method 700 may proceed with the gaming device 108 displaying a randomly selected hand from the set of eligible hands (step 716). The gaming device 108 may then wait for player 112 input, which may include a hold selection in the case of a video poker game, a hit select in the case of a video blackjack game, etc. The method 700 proceeds when a hold selection is received from the player 112 (step 720).

Based on the hold selection and further based on the information previously received from the centralized gaming server 116, the gaming device 108 may determine new cards (if any) to deal to the player 112 (step 724). The new cards may or may not achieve the previously determined prize value, depending upon whether the player 112 provided a hold input that makes the prize value possible. The new cards may then be displayed to the player 112 (step 728) along with a display of the award being provided to the player 112 (step 732). In some embodiments, the award includes an award of normal credits based on the payout value of the final hand. In embodiments where the payout value of the final hand is less than the prize value, then the method 700 may further include awarding additional credits to the player 112 via a bonus (step 736). In some embodiments, the bonus provided to the player 112 reconciles the difference between the prize value and the payout value. In some embodiments where a difference exists, the split award (e.g., the normal credits and the bonus payout) may include two portions that add up to the prize value. In some embodiments, the split award includes a first award portion (e.g., the normal credits) that has a first value equal to the payout value and a second portion (e.g., the bonus) that has a second value equal to the difference between the prize value and the payout value. Utilization of a split award enables the player 112 to play a game of chance and/or skill while also using a centralized gaming server 116 (e.g., a central determination system).

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A system comprising:

a communications interface;

a display device;

a processor coupled with the communications interface and the display device; and a memory coupled with and readable by the processor and storing therein a set of instructions which, when executed by the processor, causes the processor to:

receive, from a centralized gaming server, via the communications interface, an electronic message comprising information describing a prize value to award a player in response to the player playing a game at a gaming device;

determine a game outcome at the gaming device results in a payout value that is different from the prize value; and provide, to the player, through the display device, an indication of a split award that reconciles the difference between the prize value and the payout value.

2. The system of claim 1, wherein the split award includes a first award portion that has a first value equal to the payout value and a second portion that has a second value equal to the difference between the prize value and the payout value.

3. The system of claim 1, wherein the instructions further cause the processor to:

determine an eligible hand to deal to the player based on the information received from the centralized gaming server.

4. The system of claim 3, wherein the instructions further cause the processor to:

receive an indication of a hold selection from the player;

select one or more new cards to deal to the player, wherein the one or more new cards are selected based on the information received from the centralized gaming server and the hold selection; and display, through the display device, an updated hand to the player that includes the one or more new cards.

5. The system of claim 4, wherein the one or more new cards are selected to minimize a difference between the prize value and the payout value.

6. The system of claim 4, wherein the one or more new cards are selected in an attempt to match the prize value with the payout value.

7. The system of claim 3, wherein determining the eligible hand comprises:

looking up a record set of eligible initial hands; and randomly selecting the eligible hand from the record set of eligible initial hands.

8. The system of claim 7, wherein the record set of eligible initial hands is limited to hands that are capable of producing the prize value.

9. The system of claim 8, wherein the game comprises a poker game and wherein the record set of eligible hands comprise poker hands.

10. The system of claim 1, wherein the game comprises a game of skill and wherein the prize value is centrally determined prior to the player providing a skill-based input to the game.

11. The system of claim 10, wherein the game of skill comprises poker and wherein the skill-based input comprises a hold selection made by the player.

12. A method comprising:

receiving, by a gaming device, from a centralized gaming server, information describing a prize value to award a player in response to the player playing an electronic game on the gaming device;

determining, by the gaming device, a game outcome of the electronic game results in a payout value that is different from the prize value; and providing, by the gaming device, to the player, an indication of a split award that reconciles the difference between the prize value and the payout value.

13. The method of claim 12, wherein the player is provided with the indication of the split award by incrementing a credit meter of the gaming device by an amount equal to the prize value.

14. The method of claim 13, further comprising displaying, by the gaming device, the payout value in addition to incrementing the credit meter.

15. The method of claim 12, wherein the game comprises a game of skill and wherein the prize value is centrally determined prior to the player providing a skill-based input to the game.

16. The method of claim 15, wherein the game of skill comprises poker and wherein the skill-based input comprises a hold selection made by the player.

17. The method of claim 16, further comprising:

receiving, by the gaming device, the hold selection from the player;

selecting, by the gaming device, one or more new cards to deal to the player, wherein the one or more new cards are selected based on the information received from the centralized gaming server and the hold selection; and displaying, by the gaming device, an updated hand to the player that includes the one or more new cards.

* * * * *